United States Patent [19]

Callens, Jr. et al.

[11] Patent Number: 4,706,360

[45] Date of Patent: Nov. 17, 1987

[54] THREAD GAGE

[75] Inventors: E. Eugene Callens, Jr., Ruston; Leslie L. Crowson, Jr., Minden; Robert P. Kobs, Shreveport; Herbert G. Tull, III, Ruston, all of La.; Joseph F. Tahtouh, Houston, Tex.

[73] Assignee: Morton Thiokol, Inc., Chicago, Ill.

[21] Appl. No.: 862,859

[22] Filed: May 13, 1986

[51] Int. Cl.$^4$ .................... G01B 7/28; B23Q 15/02
[52] U.S. Cl. ........................... 29/407; 33/199 R; 33/554; 82/36 A; 409/131; 409/218
[58] Field of Search .................... 409/65, 66, 69, 70, 409/133, 131, 132, 210, 218; 82/2 B, 34 R, 36 A; 33/199 R, 199 B, 505, 554; 29/406, 407; 408/1 R, 12, 13

[56] References Cited

U.S. PATENT DOCUMENTS

| | | | |
|---|---|---|---|
| 3,047,608 | 8/1962 | Mittenbergs | 33/199 |
| 3,090,126 | 5/1962 | Kernoski | 33/149 |
| 3,319,340 | 5/1967 | Graham | 33/554 |
| 3,432,935 | 3/1969 | Reish | 33/199 |
| 3,516,166 | 6/1970 | Moore | 33/199 |
| 3,537,184 | 1/1970 | Hearn | 33/199 |
| 3,650,397 | 3/1972 | Bornemeier | 209/80 |
| 3,749,500 | 7/1973 | Carlson et al. | 356/156 |
| 3,829,220 | 8/1974 | Parkinson | 356/160 |
| 3,840,994 | 10/1974 | Izumi et al. | 33/505 X |
| 3,854,822 | 12/1974 | Altman et al. | 356/156 |
| 3,902,811 | 9/1975 | Altman et al. | 356/156 |
| 3,924,953 | 12/1975 | Allard | 356/167 |
| 3,986,774 | 9/1976 | Lowery, Jr. et al. | 356/3 |
| 4,106,206 | 8/1978 | Piehl | 33/199 R |
| 4,148,146 | 4/1979 | Holland | 33/199 R |
| 4,201,476 | 5/1980 | Musto et al. | 356/386 |
| 4,202,109 | 5/1980 | Schasteen | 33/199 R |
| 4,219,938 | 9/1980 | Tommeraas et al. | 33/199 R |
| 4,275,507 | 6/1981 | von Haas | 33/199 B |
| 4,315,688 | 2/1982 | Pryor | 356/73 |
| 4,324,049 | 4/1982 | Blose | 33/199 B |
| 4,425,715 | 1/1984 | Willis et al. | 33/199 R |
| 4,440,496 | 4/1984 | Milana | 356/241 |
| 4,544,268 | 10/1985 | Yamada et al. | 356/394 |
| 4,559,711 | 12/1985 | DeBoynton et al. | 33/199 |
| 4,562,392 | 12/1985 | Davis et al. | 82/36 A X |
| 4,576,069 | 3/1986 | Bazuin | 409/133 X |

OTHER PUBLICATIONS

"Now, Contour Bore-And More with Programmable Tool Head", W. J. Reed, Machine & Tool Blue Book, Jul. 1979, pp. 98-104.
"Standard Instrumentation for Computer Automated Measurement & Control", L. Costrell, IEEE Transaction Industry Applications, vol. IA-11, No. 3, May/-Jun. 1975, pp. 319-322.
"Revised MIL Specs Open New Era for Internal Thread Inspection", Cass Kaifesh, Tooling & Production, Jan. 1974, pp. 49-51.
"Use of Ultrasonics When Rolling Internal Threads", M. S. Nerubai & V. P. Usov, Vestnik Mashinostroeniya, vol. 54, Issue 10, 1974, pp. 60-61, Russian Engineering Journal, pp. 59-60.
Thread Inspection and Measurement, pp. 112-149.
"Improved Technology Gives Stronger Rolles Threads in Aluminium Housings", E. V. Ryzhov et al., Vestnik Mashinostroeniya, vol. 56, Issue 1, 1976, pp. 56-58, Russian Eng. Journ., pp. 49-51.
"Measurement of Tapping Torques", D. G. Bellow and G. C. Kiss, Experimental Mechanics, May 1981, pp. 205-208.

(List continued on next page.)

Primary Examiner—Eugene F. Desmond
Assistant Examiner—Glenn L. Webb
Attorney, Agent, or Firm—Gerald K. White; James C. Simmons

[57] ABSTRACT

A thread gage for use with a threading machine for automatically and quickly gaging a thread after it is formed. A stylus support is mounted on the machine turret for placement of the stylus in position for movement axially of the thread to follow the thread contour. The stylus is connected to a transducer. The machine computer control may be programmed to receive signals from the transducer indicative of radial position of the stylus tip and signals relative to axial position of the turret indicative of axial position of the stylus tip to form a digital model of the thread which may then be compared to a standard thread and/or used to make adaptive threading machine offsets.

23 Claims, 8 Drawing Figures

OTHER PUBLICATIONS

"On the Mechanics of Tapping by Cutting¹", W. E. Henderer, Journal of Engineering for Industry, Feb. 1977, pp. 257-262.

"Precision Internal Threading of Stainless Steel", T. Saotome, F. Yokoi, & J. Kumabe, Precision Engineering, vol. 6, No. 2, Apr. 1984, pp. 73-78.

"High Speed Steel Cutting Tools", V. Wickham, Somta Tools (Pty) Limited, Pietermaritzburg, Republic of South Africa, pp. 214-224.

"Application of a Rapid Threading System for Internal Threads", P. Casey, Watervliet Arsenal, Mar. 1975 (AD-AO12 756), distributed by: NTIS U.S. Department of Commerce, pp. Cover-32.

"The Stangert Corp.", Thomas Resgister Catalog File 1982, 6579, 6583, 2891, 2849, Gages: Thread Measuring.

"Application of the JENA Small-Bore Measuring Microscope for Measuring Small Internal Threads", D. von Stockhausen, Technical University, Dresden, Section Metrology, pp. 280-284.

"Thread Inspection & Measurement", J. S. Murphy, Screw Thread Production, vol. 1, The Machinery Publishing Co, LTD., London, pp. 101-111.

"Secondary Manufacturing Processes: Material Removal", Product Design & Process Engineering, B. W. Nichol and A. B. Draper, Ch. 13, pp. 460-502, 1971.

"Thread Samples & Analysis", Manual of Die-Hard Thread Cutting, H. Schlarman, McGraw Hill Book Co., Inc., N.Y., 1969, pp. 171-181, Chapter XII.

"Thread Troubles", Manual of Die-Hard Thread Cutting, H. Schlarman, McGraw Hill Book Co., Inc, N.Y., 1969, pp. 154-170, Ch. XI.

"Screw-Thread Production", Machine Tools for Metal Cutting, W. H. Armstrong, McGraw Hill Book Co., Inc., N.Y., 1957, pp. 272-295, Ch. 15.

Manual on Cutting of Metals, ASME, Committee on Metal Cutting Data, 1939, The American Society of Mechanical Engineers, N.Y., Chapters 1, 2, 7, 8, 10.

"New Standard for High-Performance Thread Rolling Screws", Fasteners, H. G. Muenchinger, Fall 1970, vol. 25, No. 2.

"Measurement of Tapping Torques", D. G. Bellow & G. C. Kiss, Experimental Mechanics, May 1981, pp. 205-208.

"How 60 Degree Screw Thread Forms Differ", S. I. Kanter, Machinery, Nov. 1969, pp. 76-77.

"A Breakthrough in Tapping Blind Holes", B. Kellock, Machinery and Production Engineering, Oct. 31, 1979, pp. 38-39.

"New Burgsmuller Internal-Thread Whirling Unit", Machinery and Production Engineering, Feb. 4, 1976, pp. 110-111.

"Military Standard-114C Gages, Plug, Thread, Go (Class X) for Unified & American National Standard Internal Threads", Mar. 15, 1963, pp. Cover-32, Superseding MIL-STD-114B, Mar. 27, 1959.

"Military Standard-114C", Change Notice 1, Aug. 28, 1964, pp. ii, iii, 1, 2, 3, 4, 31, 32.

"Dimensional Measurement with Helium-Neon Lasers", A. R. Tebo, Electro-Optical Systems Design, Oct. 1982, pp. 21-27.

"Nine Basic Ways to Sense Position", Control Engineering, Mar. 1977, pp. 41-43.

"Self-Modulated Laser Rangefinder", Technical Support Package NASA Tech Briefs, Summer 1983, vol. 7, No. 4, GSC-12761, pp. Cover-16.

"Sensing and Automation for Turning Tools", Society of Manufacturing Engineers, J. W. Powell, J. E. Cosic, R. A. Erickson, F. M. Herko, W. A. Kline, J. E. Mayer, Jr. & A. H. Varma, MS84-909, 1984, pp. Cover-14.

"Collapsible Versus Solid Adjustable Taps", C. Gutshall, Cutting Tool Engineering, Jul./Aug., vol. 29, No. 7/8, pp. 1-6.

"The MIG System of External Gaging", Cary Kaifesh.

"The MTG System of Internal Gaging", Cary Kaifesh, pp. Cover-12.

"Digital Ranging and Imaging Non-Contact Sensors", Diffracto, T-21 & T-21S, May 10, 1981.

"Vision Systems Senses Needs of Sheetmetal Fabrication", Machine & Tool Blue Book, Hitchcock Publication, Dec. 1984, V. J. Wolanski.

"For Precision Gaging & Inspection Ex-Cell-O/Thread Gages", from Micro-Precision Operations, 3665 C-06-3681 D-08.

"Renishaw 3 Dimensional Probes for In-Cycle Gauging Applications on Machining Centres and Lathes", 30 pages.

"AM & M Precision Systems", Model 200-4 QC System, True Universal Gear Inspection, 1983, an Acme Cleveland Company.

"AM & M Precision Systems", Model 2000-4QC Software, Hob Check 2000 Software Package, 1985, an Acme Cleveland Company.

"Programmable Airfoil Contouring System" Diffracto, Ltd. (PACS).

"Analysis & Development of New Instruments for Measuring External & Internal Screw Threads of Couplings w/Interference Fits", R. Kh. Mustaev, UDC 681.2:882.2, From Izmeritel'naya Tekhnika, No. 3, pp. 26-27 March 1971.

ary, the present invention relates to gaging
THREAD GAGE

The present invention relates to thread gages. More particularly, the present invention relates to gaging apparatus and a method of gaging threads wherein a stylus is caused to follow along the profile of a thread surface and is connected to a transducer which translates the movement of the stylus into a set of electrical signals which may then be compared to a digital model of a standard thread for comparison thereto.

For manufacture of various machined parts such as, for example, projectile casings, it is often necessary that threads for such parts be machined to very exacting specifications. Thread forms consist of a large number of parameters which are interrelated. These thread form parameters include pitch diameter, pitch cylinder, pitch, major diameter, minor diameter, included angle, helix angle, and lead angle. The interrelationship between these various thread parameters is such that a variation in one of them will cause variations in others of them. For example, a variation in the included angle may cause a variation of the pitch diameter and the minor diameter. In order to achieve the preciseness of thread form required in some applications, it is desirable to have a thread gage which will measure all of these various thread form parameters in a single operation, i.e., map the thread profile, and with sufficient rapidity that it is economically feasible to gage the thread form of every machined part as soon as it is produced.

Bench-type gage structures such as disclosed in U.S. Pat. No. 3,319,341 to Graham do not provide the rapid measurement of threads and do not provide for rapid correction thereof as is desired for modern production machinery. In addition, such gage structures of the bench-type do not lend themselves readily to measuring the thread of every workpiece as soon as it is produced since this would require the time consuming process of setting up the threaded workpiece for measurement each time a thread thereof is to be measured. As a result, there may be a tendency in using such bench-type gage structures to use them only as audit type quality control gages, i.e., to only measure the threads of a random number of workpieces and thus not achieve the preciseness of thread form for every machined part as may be desired.

In profile indicating devices wherein the art supporting a follower blade extends from the follower blade in a direction parallel to the rotational axis of the workpiece being measured, such as shown in FIG. 1 and more clearly in FIG. 5 of Graham, a great deal of difficulty is encountered in getting the follower blade to climb steep thread surfaces and in obtaining signals which produce an accurate profile. It has been proposed to use a vibrator to impart to the follower high frequency vibrations in a direction upwardly and downwardly relative to the surface being traversed to "assist" the follower in climbing steep surfaces. However, as pointed out in the second paragraph of the Graham patent, the use of the vibrator itself imparts undesirable vibrations and harmonics and otherwise generally erratic behavior to the follower and its supporting structure. In an attempt to solve this problem, Graham proposes complicated improvements involving shock absorbing and damping means and relocating of the vibrator on the carriage. Not only are such complicated vibration and shock absorbing means undoubtedly unreliable but the use of such equipment should have the effect of slowing the equipment down so that it takes longer to gage a thread portion than it would otherwise take.

It is therefore an object of the present invention to provide a thread gage which will rapidly and automatically measure all of the various thread form parameters of a thread in a single operation, i.e., map the thread profile.

It is another object of the present invention to provide such a thread gage wherein it is not required that the threaded workpiece be set up in a separate machine for measurement after threading thereof is completed.

It is a further object of the present invention to provide such a thread gage wherein the thread form parameters are measured automatically after a thread is cut in a production threading machine, that is, wherein the thread gaging is conducted as a real time operation in the production threading machine so that accept/reject decisions may be made before removal of the workpieces from the production threading machine.

It is yet another object of the present invention to provide such a thread gage for use to make adaptive machine offsets.

It is another object of the present invention to provide such a thread gage wherein the stylus thereof can easily and quickly traverse steep thread faces without the requirement of vibration devices.

It is a further object of the present invention to provide such a thread gage which is reliable, rugged, and inexpensive.

These and other objects of the invention will become apparent in the following detailed description of the preferred embodiments of the invention taken in conjunction with the accompanying drawings. dr In the drawings.

DETAILED DESCRIPTION OF THE PREFERRED EMBODIMENTS

Figure 1:
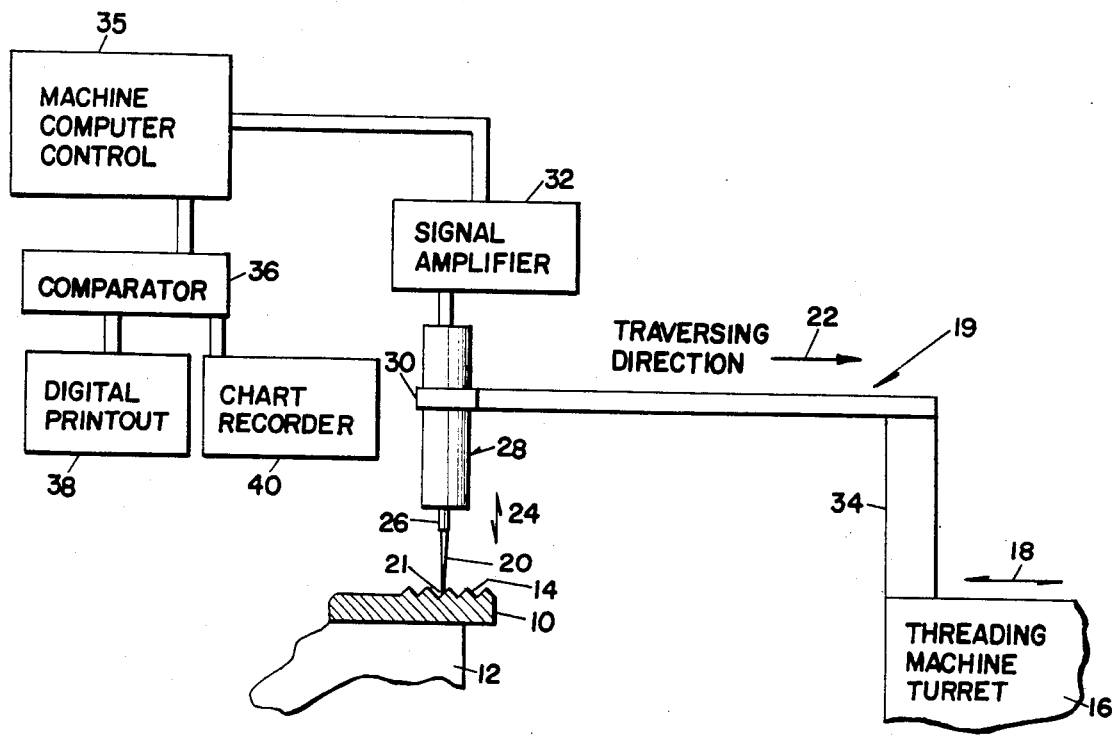
FIG. 1 is a schematic view of a thread gage embodying the present invention.

Referring to FIG. 1, there is shown at 10 a workpiece portion held in a workpiece holder 12 of a production threading machine. Illustrated at 14 is a thread which has been cut in the workpiece 10 by the production threading machine. Although internal threads are illustrated in the drawings, it is understood that a thread gage embodying the present invention may also be used to measure external threads. As the term is used in this specification and claims, the term "thread" is meant to refer to a contoured portion of a workpiece including, but not limited to grooves, undulations, threads, inclined planes, and the like. The production threading machine includes a turret illustrated at 16 which is a revolvable holder of two or more tools or the like for performing in sequence two or more operations on a workpiece 10. For example, one such tool may be a drill for forming the hole in which thread 14 is cut and another such tool may be a threaded tool for cutting the thread 14. For performing various threading and other machining operations as well as thread gaging as will be described hereinafter, the turret 16 is movable in the directions illustrated at 18 which are axially of the workpiece holder 12 and of the thread 14 cut in the workpiece 10.

A reliable yet structurally non-complex thread gage which has a minimum of moving parts is generally illustrated at 19. In order to measure the various thread form parameters for the thread 14, the thread gage includes a stylus means or follower 20 which has a tip 21 which is caused to move or follow over the surface of the thread 14 and thus map the thread contour as the stylus is moved in a direction 18 axially of the thread 14, preferably in the axial direction illustrated at 22 to thus pull the stylus over the thread surface, with the workpiece 10 held in a non-rotating stationary position. Alternately, it is envisioned that the stylus 20 may be held stationary while the workpiece 10 is moved in an axial direction 18. Thread gage 19 is preferably set up to climb the less steep thread faces and biased to move down the steeper thread faces. Thus, as the stylus 20 is moved relative to the thread 14 in a direction 18 axially of the thread 14, the thread contour will effect movement of the stylus tip 21 in directions illustrated at 24 radially of the thread 14, the stylus 20 being biased radially by suitable biasing means as will be described hereinafter to engage the thread surface.

As the terms are used in this specification and the claims, unless stated otherwise, the "radial" and "axial" directions are meant to refer to directions perpendicular to and parallel to respectively the axis of rotation of a workpiece holder and the thread of a threaded member held therein to be measured by a thread gage of the present invention. It is understood that movement may be in both axial and radial directions at the same time.

The stylus 20 is mounted directly to the shaft or inline probe 26 of a linear variable displacement transformer (hereinafter called "LVDT") 28 or other suitable transducer means which provides good linearity, repeatability, and sensitivity. The LVDT 28, which may have spring means (not shown) internally thereof to provide the aforesaid biasing of the stylus for radial movement, is mounted on a support means 30 for supporting the LVDT 28 and stylus 20 in position for following the thread contour. The diameter of the stylus tip 21 is preferably small enough, such as 0.0015 inch, to engage the root of the thread to be measured.

The LVDT 28, an instrument commonly known to those of ordinary skill in the art to which this invention pertains, is provided to translate the linear displacement of the stylus tip 21 in radial directions 24 into a set of electrical signals which correspond to the position of the stylus tip 21 in the axial directions 18 and to amplify these signals in the signal amplifier illustrated at 32 so that these signals may be used to provide a digital model of the thread 14 as will be described hereinafter. An LVDT is an electromechanical device that produces an output proportional to the displacement of a separate movable core, i.e., probe 26. It includes a primary coil (not shown) and two secondary coils (not shown) spaced symmetrically. A free-moving rod magnetic core (not shown) inside the coil assembly provides a path for the magnetic flux linking the coils. When the primary coil is energized by an external alternating current source, voltages are induced in the two secondary coils. The coils are connected in opposing series so the two voltages are of opposite polarity. The net output of the transducer is the difference between these induced voltages. The output is zero when the core or probe 26 is at a center or null position. As the core or probe 26 is displaced from the null position, the induced voltage increases in one coil and decreases in the opposite coil. The stylus tip displacement is mechanically amplified at the transducer core depending on the relative arm-to-pivot-length ratios. Thus, stylus motions caused by the thread form produce transducer outputs to result in high sensitivity and accuracy.

If the thread gage 19 were to be provided as a bench-type structure, a tedious and costly process of setting up the gage for each workpiece to be measured would be required. In order to automatically measure all of the various thread form parameters while the workpiece is still in the production threading machine so that each workpiece can be checked quickly without the tedious requirement of setting it up, there is provided, in accordance with the present invention, means such as connecting member 34 for connecting the LVDT and stylus support 30 to the production threading machine turret 16 whereby, after a thread is cut, the turret 16 may be revolved into position for quickly and efficiently positioning the stylus 20 for gaging or measuring the thread 14. With the gage 19 mounted to the turret 16, the production threading machine's tool slides may be used as the traversing mechanism for movement of the stylus in the directions 18 axially of the thread.

In accordance with a preferred embodiment of the present invention, the output of the LVDT 28 is connected to the computer control system illustrated at 35 of the production threading maching which computer control 35 is programmed to provide information relative to the position of the stylus tip 21 in the axial directions 18 based on the position of the machine turret 16. Such information, i.e., position of the turret, would typically be programmed in the computer control 35 for various other machine operations. Computer control 35 is also preferably programmed with a digital model of a standard thread against which it is desired to compare thread 14. In the comparator portion illustrated at 36 of the computer control 35, the signal from the LVDT 28 is digitized and compared to the digital model of the standard thread. The output of the comparator 36 may be provided to a digital printout illustrated at 38 and/or a chart recorder illustrated at 40. The chart recorder 40 may provide an analog output displayed on a strip chart. The printout 38 may be a tabular printer capable of printing the numeric values for the various thread form parameters.

In accordance with a preferred embodiment of the present invention, the comparator 36 may also be programmed to compare the difference between the actual readings provided by the LVDT 28 and the mathematical model of a standard thread to a set of predetermined limits and to provide the output to machine control 35 which may then make the accept/reject decision based upon whether or not the difference is within or outside of the predetermined limits. The computer control 35 may also be programmed to generate machine updates to the tool offset register based upon such comparisons to thus allow the production threading machine to automatically increase the tool offset within specified limits so that later produced workpieces will have thread parameters closer to those of the standard thread. Comparisons of thread profiles may be used to perform tool wear time studies, to look for gradual or rapid breakdown of a tool, or to determine that a tool is chipped.

After a thread 14 has been cut in a workpiece 10 by a threading tool in a turret position, the thread gage may be used by rotating the turret to a predetermined position for positioning the stylus 20 so that its tip 21 contacts the thread surface. The axial position of the stylus tip 21, being related to the axial position of the turret 16, is recorded in the machine computer control 35. Then, in order to obtain a digital model of the thread contour, the turret 16 is caused to move in an axial direction 18 to thus cause the stylus tip to move in an axial direction, preferably the direction illustrated at 22. Since the change in position axially of turret 16 is recorded by the machine computer control 35 and is proportional to the change in position axially of the stylus tip 21, the change in position axially of the stylus tip is recorded in the computer control 35. As the stylus 20 is moved axially, its tip 21 must of necessity move radially while moving axially to follow the thread surface. The LVDT 28 translates the radial positions of the stylus tip 21 corresponding to axial positions thereof into electrical signals which are then transmitted to the signal amplifier 32 where the signals are amplified and then transmitted to the machine computer control 35 where a digital model of the thread 14 is produced from the signals indicating the axial positions of the turret 16 and the LVDT signals indicating the radial position of the stylus tip 21 at each axial position of the turret 16. This digital model is compared in the comparator 36 with a digital model of a standard thread which has been predetermined and programmed therein. The difference between the actual readings provided by the LVDT 28 and the mathematical model of a standard thread is compared to a set of predetermined limits. The machine computer control 35 may be programmed to automatically accept or reject the workpiece 10 based upon whether or not the difference is inside or outside of the predetermined limits and perhaps also to generate a machine update to the tool offset register if the difference is outside the predetermined limits. Thus, a thread gage embodying the present invention is provided to allow the contour of each thread to be automatically and quickly and accurately checked against a standard thread contour while still set up in the thread cutting machine after the thread is cut so that it may be automatically rejected if the measurements are outside the range of acceptability.

Figure 2:
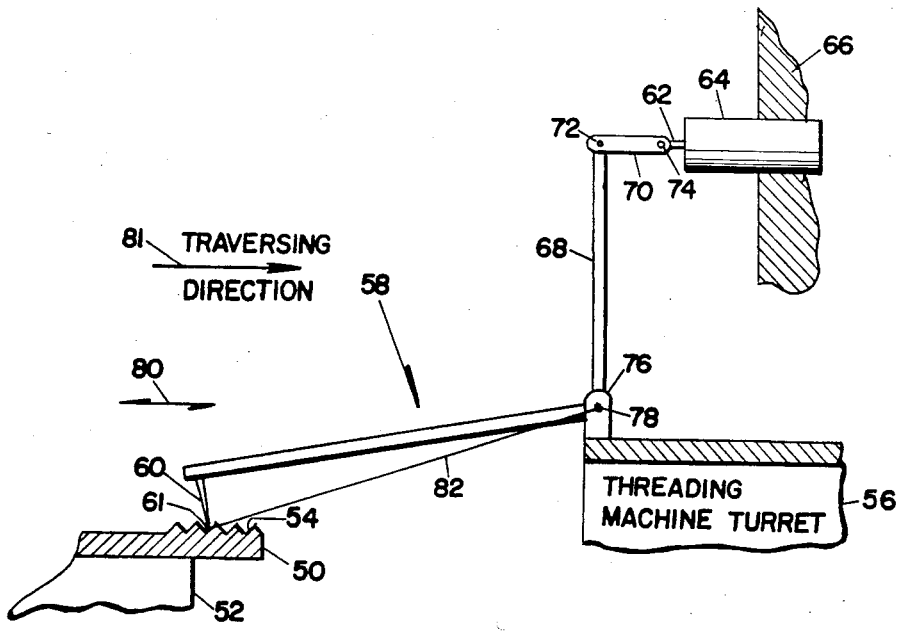
FIG. 2 is a view similar to that of FIG. 1 of an alternative embodiment of a thread gage of the present invention.

FIG. 2 illustrates an alternative embodiment of the present invention wherein 50 represents a workpiece portion, 52 represents a workpiece holder, 54 represents a thread cut in the workpiece, 56 illustrates a production threading machine turret, 58 illustrates generally a thread gage in accordance with the alternative embodiment, 60 illustrates a stylus for following the thread contour, 61 illustrates the stylus tip, and 62 illustrates the shaft or probe for LVDT 64 all of which elements correspond to similarly named elements in FIG. 1. In accordance with this alternative embodiment of the invention, LVDT 64 is fixed to a foundation 66 and its shaft or probe 62 is pivotally connected to stylus 60 by linkage means including links 68 and 70. Link 70 is connected between link 68 and probe 62 by pin joints 72 and 74 respectively. Link 68 is pivotally connected to turret 56 of the production threading machine at member 76 to rotatably move about pviot point member 78, which member 76 is fixed to turret 56 and pivot point member or shaft 78 is connected to member 76, so that movement of the turret 56 in a direction illustrated at 80 axially of the thread (preferably the direction illustrated at 81) will effect movement of the stylus tip 61 axially of the thread, and the links 68 and 70 will transmit the stylus tip position to the probe 62 of LVDT 64. Turret 56 and foundation 66 are either connected or otherwise adapted for movement at the same rate of speed. The signals generated by LVDT 64 are then amplified and transmitted to the machine computer control for use similarly as described for the embodiment of FIG. 1.

Figure 3:
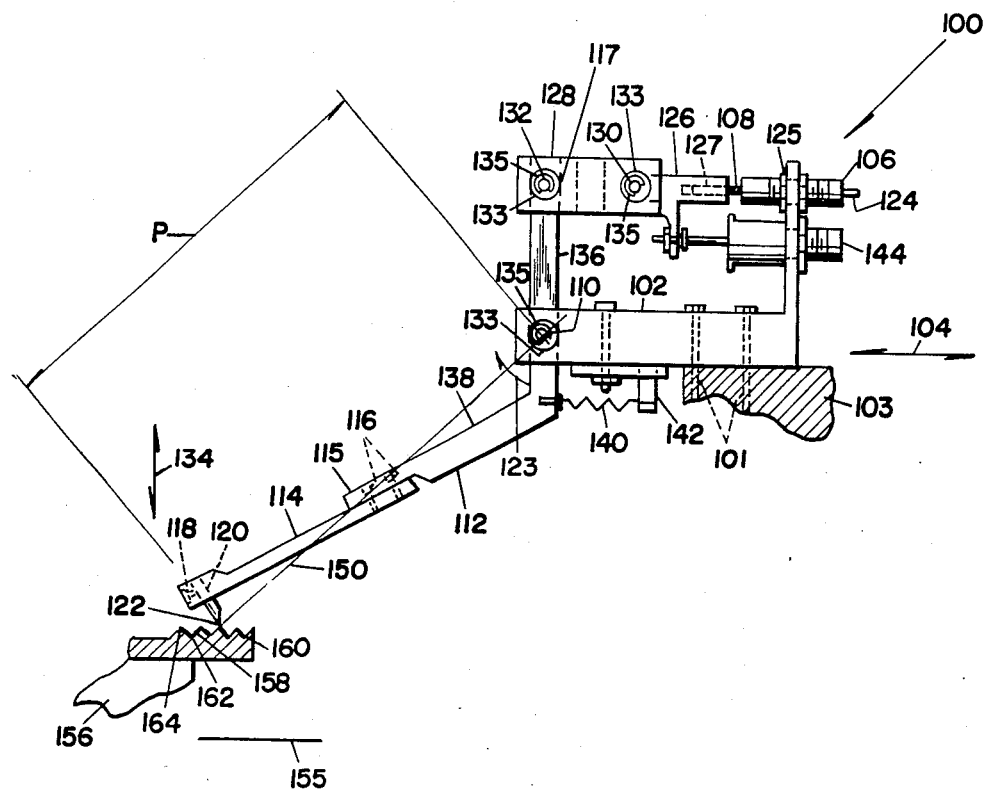
FIG. 3 is a plan view of the alternative embodiment of the thread gage of FIG. 2.

FIG. 3 is a plan view of a thread gage 100 similar to the thread gage 58 schematically illustrated in FIG. 2. At 102 is a member provided for mounting of the gage 100 by connecting means illustrated at 101 to a production threading machine turret 103 for movement in directions illustrated at 104 axially of a thread 160 to be measured by gage 100 so that movement of the thread gage 100 is in a direction parallel to the rotational axis of a thread 160 to be measured. Connected to mounting member 102 by suitable connecting means illustrated at 125 is LVDT 106 for movement therewith. LVDT 106, which is similar to LVDTs 28 and 64 in FIGS. 1 and 2 respectively, includes probe 108 which is movable in and out thereof in directions 104 and output means 124. In order that the LVDT may be positioned outside of an internally threaded member to be measured so that smaller diameter internal threads may be measured as well as to eliminate or reduce the side loads on LVDT bearings which may be undesirably experienced when the stylus is directly connected to the LVDT, there is provided, in accordance with the present invention, a linkage system pivotally connecting the LVDT 106 and stylus 120 as will now be described. Pivotally connected to mounting member 102 to rotate about pivot point member or pivot shaft 110 is link or pivot arm 112, which has end portions 115 and 117. A stylus holder 114 is connected at one end portion to one end portion 115 of the pivot arm 112 by suitable connecting means illustrated at 116. The stylus holder 114 and pivot arm 112 in combination correspond to and function similarly to link 68 in FIG. 2. Extending perpendicularly from the other end portion of the stylus holder 114 and connected thereto by suitable connecting means illustrated at 118 is stylus 120 which tapers to a tip 122, similar to stylus and tip 60 and 61 respectively of FIG. 2, for engaging a thread face 158 wherein movements of the stylus tip 122 in directions, illustrated at 134, radially of the thread 160 are changed to rotary movements, illustrated at 123, about the pivot point member 110. LVDT probe 108 is threadedly or otherwise suitably attached to linkage member 126, such as by internal threaded connection illustrated at 127. Link 128 is pivotally connected to linkage member 126 at pivot shaft 130 at one end portion and to the end portion 117 of pivot arm 112 at pivot shaft 132 at the other end portion thereof, and sized and positioned, in accordance with engineering principles of common knowledge to those of ordinary skill in the art to which this invention pertains, to provide suitable resolution of the rotary movements 123 of the pivot arm 112 to linear movements in axial directions 104 for input to the LVDT 106 via probe 108 and without binding of the LVDT 106. Suitable ball bearings 133 are provided to facilitate the pivotal movements at the pivot shafts 110, 130, and 132, and the pivot shafts are retained in position by suitable retainer rings 135. Such linkage between the pivot arm 112 and LVDT 106 may be constructed using principles of common knowledge to those of ordinary skill in the art to which this invention pertains. The pivot arm 112 includes a first portion 136 (which terminates at edn portion 117) which extends in direction 134 generally radially of the thread between the pivot shafts 110 and 132 and further includes a second portion 138 (which terminates at end portion 115). The second portion 138 together with the stylus holder 114 extend generally between the pivot shaft 110 and stylus 120 at an angle relative to the radial and axial directions 134 and 104 respectively which will be described hereinafter. Link 128 as well as linkage member 126 and LVDT probe 108 extend generally in the axial direction 104, but a gage may be built in accordance with the present invention, in accordance with principles commonly known to those of ordinary skill in the art to which this invention pertains, wherein they extend in another direction.

It is preferable to set up the thread gage 100 to profile a thread at a position of the thread circumference along the sides or top thereof rather than along the bottom where dirt may accumulate. A suitable extension spring 140 adjusted by a suitable spring adjuster 142 is preferably provided to bias the pivot arm 112 to effect engagement of the stylus tip 122 against the thread surface when the thread gage is set up to profile a thread at such side or top positions. A different spring may be substituted to adjust the natural frequency and reduce vibrations. In addition, as previously described, an internal spring in the LVDT 106 may also be provided to hold the stylus tip 122 against the thread surface.

A suitable conventional damping device 144 such as one of the air type is preferably mounted to member 102 and suitably connected to linkage member 126 for damping and accommodating thread surface roughness and jerky movements that might occur at the corners of the thread crests 164.

Figure 4:
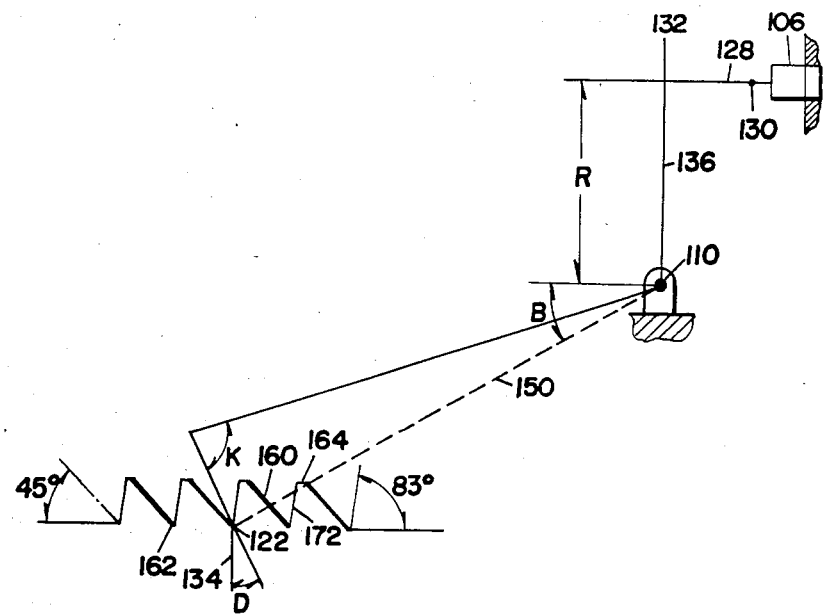
FIG. 4 is a diagrammatic view illustrating the linkage geometry for the thread gage of FIG. 3.
Figure 5:
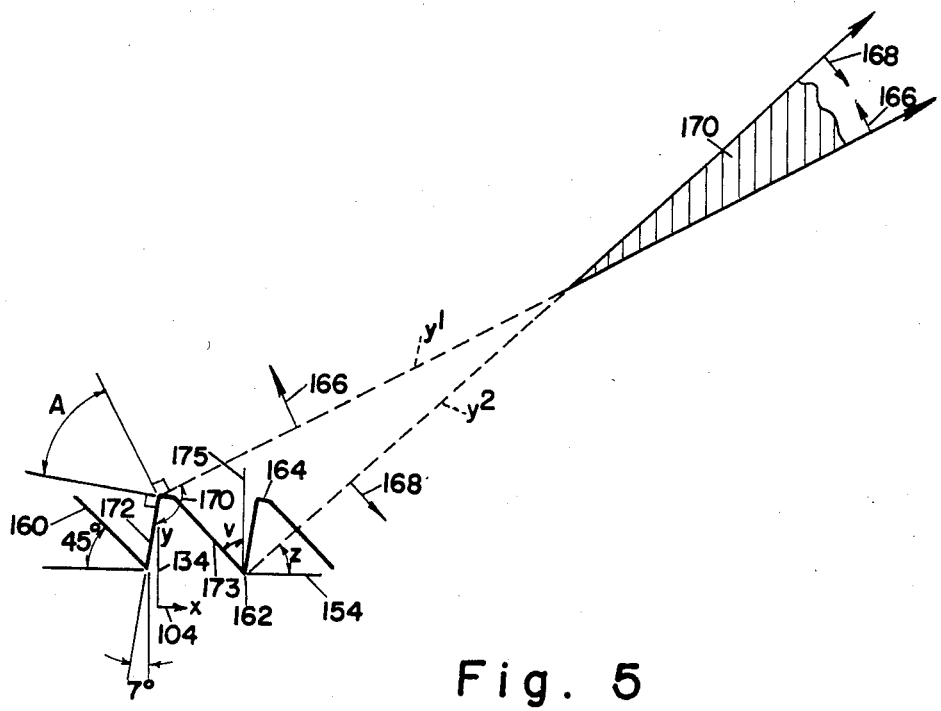
FIG. 5 is a view similar to that of FIG. 4 illustrating the geometry for plotting the pivot point constraint region for the thread gage of FIG. 3.
Figure 6:
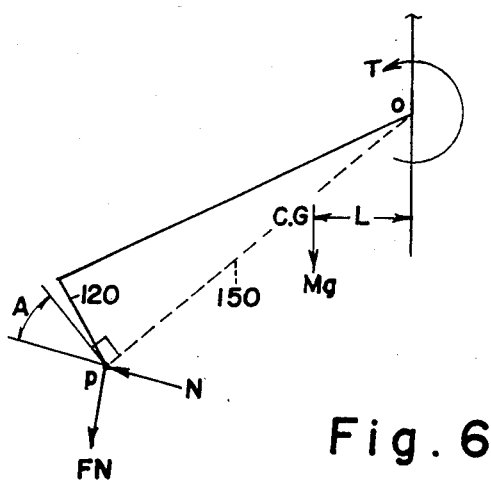
FIG. 6 is a view similar to that of FIG. 4 illustrating a free body diagram of the linkage system for the thread gage of FIG. 3.

In accordance with the present invention, in order to select the position of the pivot shaft 110 relative to the stylus tip 122 so that steep thread faces 158, such as the 83 degree face 172 shown in FIG. 4 and even 90 degree faces, can be quickly traversed or climbed by the stylus tip 122, i.e., at speeds axially of a thread of ten inches per minute or more so that a typical thread gaging operation need only require perhaps ten seconds, and so that the stylus tip can remain fully in contact with the surfaces of all thread faces to be measured and so that the thread gage is sized to be attachable to the production threading machine turret for use, the following constraints are considered. Referring to FIGS. 4 to 6, the location of the pivot shaft 110 is constrained by the pressure angle A at the thread crest 164 and the geometry of the thread 160. The pressure angle A is the angle between the instantaneous direction of motion of the stylus tip and the normal to the thread face 172 engaged by the stylus tip during movement of the stylus tip toward the thread crest. The direction of motion of the stylus tip changes as the pivot arm rotates. The length R of the pivot arm portion 136 depends on the displacement range of the LVDT 106 and the thread height and can be determined by applying principles commonly known to those of ordinary skill in the art to which this invention pertains. The stylus size and shape are constrained by the included angle of the thread and can be determined using engineering principles of common knowledge to those of ordinary skill in the art to which this invention pertains. The stylus tip 122 should be sharp enough, as previously discussed, to touch the thread root 162.

Referring to FIGS. 4 and 5, line y2 represents the position of the straight line 150, which extends between pivot point 110 and stylus tip 122, when the stylus tip 122 engages a thread root 162 and is defined so that the angle Z between thread or workpiece holder rotational axis (i.e., a line 154 parallel to the rotational axis thereof) and line y2 is less than the flank angle V of the thread tooth at the root 162 so that the stylus tip 122 stays in contact with the thread surface as the turret 103 moves in a direction axially of the thread away from the thread, i.e., so that the stylus tip 122 stays in contact with the thread surface as it moves from the thread crest 164 to the thread root 162 as well as when it climbs the next successive face to the next successive crest 164. The flank angle V, for the purpose of this specification and the claims, is defined as the angle at the root of a thread tooth between the tooth face (i.e., face 173) upon which the stylus tip moves radially toward the root and a radial plane (i.e., plane 175) of the thread. Thus, the pivot point or pivot shaft 110 is located below the line y2, as indicated by arrow 168. The straight line 82 in FIG. 2 illustrates a straight line for thread gage 58 which provides a similar illustration to straight line 150 in FIGS. 4 and 5.

Line y1 represents the position of the straight line 150 when the stylus tip 122 engages a thread crest 164 and is defined by the maximum allowable pressure angle A so that the pivot point or pivot shaft 110 is located above the line y1, as indicated by arrow 166. Referring to the free body diagram of the system shown in FIG. 6, the maximum allowable pressure angle A is computed by summing the moments about the pivot point o, which is 110 in FIGS. 3 and 4 and 78 in FIG. 2, at static conditions as follows:

$$N p(\cos A - F \sin A) = T + M g L$$

where,
N is the thread surface reaction on the stylus 120
T is the spring torque about the pivot point
M is the mass of the system
F is the friction coefficient between the thread surface and stylus tip 122
A is the pressure angle
p is the distance along straight line 150 from the pivot point 110 to the stylus tip 122
g is the acceleration due to gravity
L is the horizontal distance (distance in the axial direction 104) from the center of gravity (C.G.) to the pivot point 110

To move the stylus away from the thread, Np(cos A − F sin A) should always be positive which means that $$\cos A - F \sin A > 0$$

Thus, $$A_{max} = \arctan(1/F).$$

Therefore, the angle 170 between line y1 and the thread face 172 to be climbed by the stylus tip toward the crest 164 is greater than $180° - \arctan(1/F)$.

F, the friction coefficient, depends on the materials of the stylus tip 122, the workpiece and lubricants, if any.

Assuming F to be 0.35, for example, the maximum pressure angle $A_{max}$ is $$A_{max} = \arctan(1/0.35) = 70.71°.$$

To provide a margin for error, the angles A and Z may be chosen to be, for example, 50° and 40°, respectively. By translating to the same reference axis, the two constrained line equations are $$y1 = \tan[90° - (A+7°)](x + \text{thread height}) = (\tan 33°)(x + 0.0678)\text{in}.$$

$$y2 = (\tan Z)(x - \text{Horiz. dist. crest @134 to root @162}) = (\tan 40°)(x - 0.083)\text{in}.$$

where x and y are distances measured along the horizontal and vertical reference axes 104 and 134, respectively.

Since the pivot point 110 must be positioned upwardly from line y1 and downwardly from line y2 as shown by arrows 166 and 168 respectively, the pivot point 110, in accordance with the present invention, lies within the hatched region illustrated at 180. The position of the pivot point 110 is chosen from within this region 180 by considering the position of the turret and positions of other pieces of machinery. For example, the pivot point may be chosen to be at $$x = 4.039 \text{ in., and } y = 3.223 \text{ in.}$$

so that $$A_{max} = 45.37° \text{ and } Z_{max} = 38.59°.$$

The next step is to find the distance R from the pivot point 110 to the link 128. This distance depends on the displacement allowed in the LVDT 106. Assuming that the change in the angle of rotation B is small enough so that the link 128 translates only (actually the change in angle B should typically be less than 1°), the relation between the LVDT core displacement and B is $$\text{LVDT core displacement } C = R\Delta B$$

where, $\Delta B$, the change in B, is in radians.

Referring to FIG. 4, $$B_{max} = B_1 - B_{2min}$$

where $B_1 = B$ at $yp = 0$; and $B_{2min} = B$ at $yp = 0.0678$ in. where yp is the vertical displacement between the tip 122 of the stylus and pivot point 110.
also, $$B = \arcsin((y - yp)/p)$$

$$p = (x^2 + y^2)^{\frac{1}{2}}$$

so, $$B_1 = \arcsin(3.223/5.167) = 38.589°$$

$$B_{2min} = \arcsin((3.223 - 0.0678)/5.167) = 37.636°$$

$$B_{max} = B_1 - B_{2min} = 38.589° - 37.636° = 0.953° \text{ (0.17 rad.)}$$

R, the distance from the pivot point 110 to link 128, is selected, for example, such that $C_{max}$ is less than 0.06 in., which is typically the range of the LVDT 106. R is chosen, for example, to be 2 in. so that $$C_{max} = R \Delta B_{max} = 2.0 \times 0.017 = 0.034 \text{ in}.$$

As shown in FIG. 4, the angle K between the stylus 120 and the pivot arm 112 is selected, for example, to be 90°, and the angle D between the stylus 120 and the thread profile, i.e., radial direction 134, is selected to be 33.5°. The pivot arm 112 may be curved, if necessary, to compensate for the angles K and D. The sizes of link 128, member 126, and the shafts 110, 130, and 132 depend on the bearing sizes.

Figure 7:
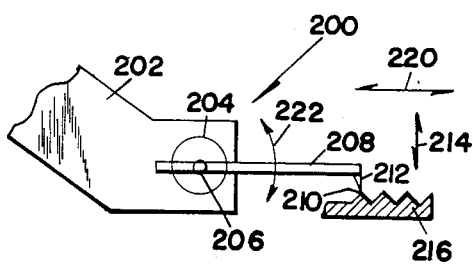
FIG. 7 is a schematic partial view of another embodiment of a thread gage of the present invention.
Figure 8:
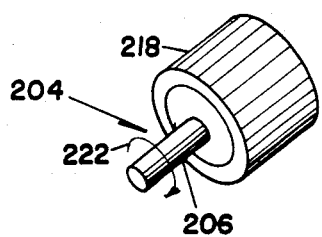
FIG. 8 is a perspective partial view of the rotary variable displacement transducer of FIG. 7.

Referring to FIGS. 7 and 8, there is illustrated generally at 200 a third embodiment of a thread gage of the present invention. A support member 202 is provided for attaching thereto to a turret of a production threading machine. In order to provide increased accuracy as well as greater adjustability for a wider range of use with more simplified linkage in accordance with the present invention, the thread gage 200 is provided with a rotary variable displacement transformer (RVDT) 204 which receives input movement through a rotatable shaft or probe 206. Shaft 206 is fixedly attached to one end portion of a lever arm 208 such that movement of stylus tip 210 on stylus 212, which is attached to the other end portion of the lever arm 208, in directions illustrated at 214 radially of a thread 216 provide an angular rotation, illustrated at 222, of shaft 206 as the thread gage 200 is moved in a direction illustrated at 220 axially of the thread 216. The RVDT 204, an alternative type of transducer means, measures rotation of the shaft 206 relative to the RVDT body 218 and provides output electrical signals indicative thereof for use similarly as described for the embodiments of FIGS. 1 and 2.

It is to be understood that the invention is by no means limited to the specific embodiments which have been illustrated and described herein, and that various modifications thereof may indeed be made which come within the scope of the present invention as defined in the appended claims.

What is claimed is:

1. A thread gage for use with a threading machine which includes a workpiece holder and further includes a turret for positioning machine tools including a tool for cutting a thread in a workpiece held in the workpiece holder and which turret is movable in directions axially of the workpiece holder and in which threading machine signals indicative of the positions axially of the turret are produced, the thread gage comprises stylus means adapted for movements in directions radially of the workpiece holder to follow the contour of the thread in the workpiece as said stylus means is moved in a direction axially of the workpiece holder, support means for supporting said stylus means for following the contour of the thread, transducer means including a probe means operated by said stylus means as said stylus means is moved in directions radially of the workpiece holder for producing signals indicative of the positions radially of said stylus means which, when combined with signals indicative of the corresponding positions axially of the turret, are indicative of the profile of the thread followed by said stylus means, and means for mounting the support means on the turret for movement of said stylus means into position for gaging a thread after it has been formed and for movement by the turret of said stylus means axially of the thread during use.

2. A thread gage according to claim 1 further comprises means for routing said signals produced by said transducer means to a computerized control means of the threading machine which computerized control means includes a digital model of a standard thread, and the thread gage further comprises means for digitizing the signals from said transducer means and comparing them to said digital model of a standard thread.

3. A thread gage according to claim 2 further comprises means for comparing the differences between the digital model signals and the corresponding digitized signals from said transducer means to corresponding predetermined difference limits.

4. A thread gage according to claim 1 wherein the thread gage further comprises means for mounting said transducer means on said support means, and said probe means is connected to said stylus means.

5. A thread gage according to claim 1 wherein said transducer means is supported in a fixed position, said stylus support means includes linkage means connected between said probe means and said stylus means, and the thread gage further comprises means for pivotally attaching said linkage means to said turret mounting means.

6. A thread gage according to claim 5 further comprises means for biasing said stylus means to engage the thread surface such that a thread may be profiled at a side or top position.

7. A thread gage according to claim 5 further comprises means connected to said linkage means for damping effects on said linkage means of thread surface roughness and jerky movements.

8. A thread gage according to claim 6 further comprises means connected to said linkage means for damping effects on said linkage means of thread surface roughness and jerky movements.

9. A thread gage according to claim 1 wherein said transducer means is a linear variable displacement transformer.

10. A thread gage according to claim 1 wherein said transducer means is a rotary variable displacement transformer.

11. A thread gage according to claim 10 wherein said probe means is a rotatable probe means and said stylus support means includes a lever arm attached to said probe means such that movements of said stylus means in directions radially of the thread effect rotation of said probe means for input to said transformer.

12. A method for gaging a thread portion of a threaded workpiece having a rotational axis comprises the steps of:
  a. moving a thread gage including a stylus and transducer in a direction axially of the thread portion with a tip of the stylus in engagement with the thread portion whereby the thread contour effects movement radially of the stylus tip as it is moved axially,
  b. transmitting the radial movement of the stylus tip through a linkage member rotatable about a pivot point member to a probe of the transducer, and
  c. selecting the position of the pivot point member such that a straight line between the pivot point member and a root point of a thread tooth forms an angle with a line parallel to the rotational axis of the workpiece holder which is less than the flank angle of said thread tooth at the root and such that a straight line between the pivot point member and the crest point of said tooth forms with the face of said tooth upon which the stylus tip moves toward said crest point an angle which is greater than $180° - \arctan(1/F)$ where $F$ is the coefficient of friction between the stylus tip and the workpiece.

13. A method according to claim 12 wherein the transducer is a linear variable displacement transformer.

14. A method according to claim 12 further comprises biasing the linkage member to engage the thread surface whereby a thread may be profiled at a side or top position.

15. A method according to claim 12 further comprises damping effects on the linkage member of thread surface roughness and jerky movements.

16. A method according to claim 15 further comprises biasing the linkage member to engage the thread surface whereby a thread may be profiled at a side or top position.

17. A method according to claim 16 wherein the workpiece is held in a workpiece holder of a threading machine which includes a turret for positioning machine tools including a tool for cutting a thread in the workpiece and which turret is moveable in directions axially of the workpiece holder, the method further comprises mounting the thread gage on the turret for movement of the thread gage including the stylus axially of the workpiece as the turret is moved axially of the workpiece.

18. A method according to claim 12 wherein the workpiece is held in a workpiece holder of a threading machine which includes a turret for positioning machine tools including a tool for cutting a thread in the workpiece and which turret is moveable in directions axially of the workpiece holder, the method further comprises mounting the thread gage on the turret for movement of the thread gage including the stylus axially of the workpiece as the turret is moved axially of the workpiece.

19. A method according to claim 18 further comprises routing signals produced by the transducer to a computerized control means of the threading machine which computerized control means includes a digital model of a standard thread, and the method further comprises digitizing the signals from the transducer and comparing them to the digital model of a standard thread.

20. A method according to claim 19 further comprises comparing the differences between the digital model signals and the corresponding digitized signals from the transducer to corresponding predetermined difference limits.

21. A method according to claim 12 further comprises routing signals produced by the transducer to computerized control means which includes a digital model of a standard thread, and the method further comprises digitizing the signals from the transducer and comparing them to the digital model of a standard thread.

22. A method according to claim 21 further comprises comparing the differences between the digital model signals and the correspnding digitized signals from the transducer to corresponding predetermined difference limits.

23. A method of profiling a thread in a workpiece which is mounted in a workpiece holder of a threading machine which includes a turret movable in directions axially of the workpiece holder comprises the steps of:
  a. mounting a thread gage including a stylus on the turret,
  b. moving the thread gage including the stylus into position to profile the thread, c. moving the turret in a direction axially of the workpiece holder to effect movement of the stylus over the thread surface, d. producing signals indicative of the positions axially of the turret during the movement of the stylus over the thread surface, e. transmitting the signals to a machine computer, f. producing signals indicative of the corresponding positions radially of the stylus during the movement of the stylus over the thread surface, and g. transmitting the radial position signals to the machine computer.

* * * * *